No. 675,616. Patented June 4, 1901.
H. R. AULD.
COUPLING FOR RUBBER TIRE CLAMPS.
(Application filed Mar. 23, 1901.)
(No Model.)
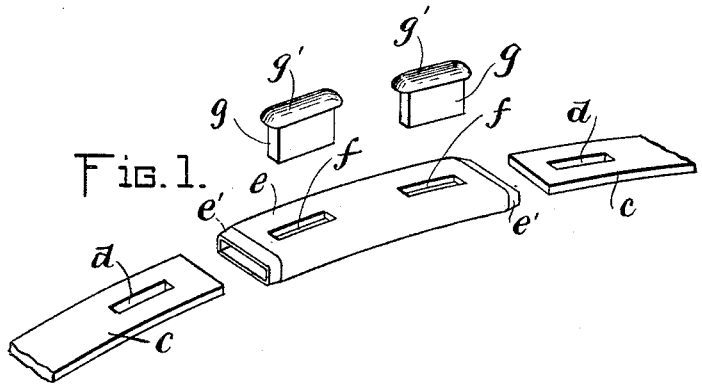
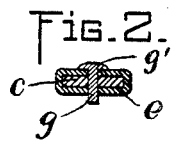 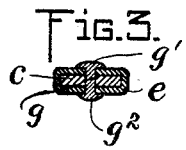
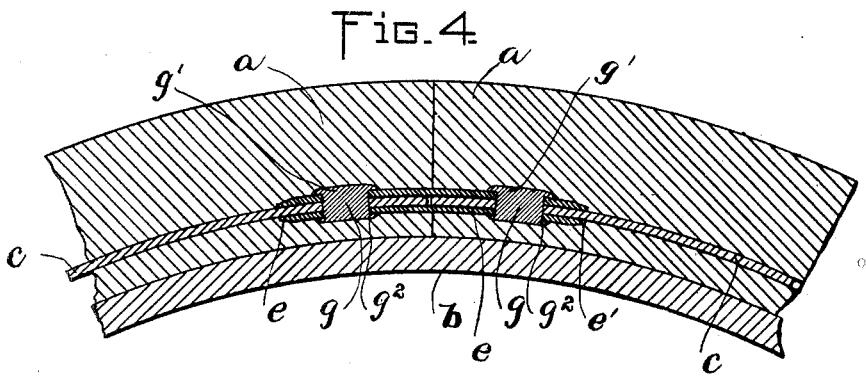
WITNESSES:
H H Brown
H Joseph Doyle
INVENTOR:
Hugh R. Auld
By Wright, Brown & Quinby
Attorneys

UNITED STATES PATENT OFFICE.

HUGH R. AULD, OF BOSTON, MASSACHUSETTS.

COUPLING FOR RUBBER-TIRE CLAMPS.

SPECIFICATION forming part of Letters Patent No. 675,616, dated June 4, 1901.

Application filed March 23, 1901. Serial No. 52,655. (No model.)

*To all whom it may concern:*

Be it known that I, HUGH R. AULD, of Boston, in the county of Suffolk and State of Massachusetts, have invented certain new and useful Improvements in Couplings for Rubber-Tire Clasps, of which the following is a specification.

This invention relates to a flexible clasp or metal tape inserted in a longitudinal orifice formed for its reception in a rubber tire for a vehicle-wheel, the ends of the clasp being permanently connected after the clasp and tire have been bent to place around the rim of the wheel.

The invention has for its object to provide a simple, durable, and effective means for connecting the ends of the clasp; and it consists in the improvements which I will now proceed to describe and claim.

Of the accompanying drawings, forming a part of this specification, Figure 1 represents a perspective view showing the end portions of the clasp or tape and the parts of the coupling or connecting device, all being disconnected. Fig. 2 represents a transverse section showing said parts connected, the inner end of the rivet shown in this figure being in its original condition. Fig. 3 represents a view similar to Fig. 2, showing the inner end of the rivet expanded or upset. Fig. 4 represents a longitudinal section of a portion of a wheel-rim and a portion of the tire thereon, the clasp being also shown in longitudinal section.

The same reference characters indicate the same parts in all the figures.

In the drawings, $a\ a$ represent the end portions of a rubber tire, which is supposed to be originally made in a single piece and bent to place around the wheel-rim $b$.

$c\ c$ represent the end portions of the metal clasp or tape, passed through a longitudinal orifice formed for its reception in the tire $a$ and permanently united at its ends to retain the tire on the wheel. The tape is oblong in cross-section and is provided near its ends with oblong slots $d\ d$, which extend longitudinally of the tape, as shown in Fig. 1, the slots being relatively narrow, so that the weakening of the tape caused by the formation of the slots is reduced to the minimum.

$e$ represents a socket, which is oblong in cross-section and is formed internally to receive and closely fit the end portions of the clasp $c$. Said socket is preferably formed by flattening a short section of thin metal tubing. The socket is provided with oblong slots $f\ f$, which extend longitudinally of the socket and are formed and arranged to coincide with the slots $d\ d$ of the clasp when the end portions of the latter are in place in the socket, there being two pairs of slots $f$, the slots of each pair coinciding with one of the slots $d$.

$g\ g$ represent oblong rivets, which are formed to fit the slots $f$ and $d$, each rivet being originally formed with a head $g'$ at one end, which head bears upon one side of the socket $e$ when the rivet is inserted, as shown in Fig. 2, the length of the rivet being such that its inner end projects from the inner side of the socket far enough to enable it to be upset on the said inner side and form an inner head $g^2$, as shown in Fig. 3. The external surface of the socket $e$ is preferably beveled at its ends, as shown at $e'\ e'$, to enable its ends to readily enter the ends of the orifice in the tire.

It will be seen that the oblong slots $d$ and $f$ and the oblong rivets $g$, all arranged, as shown, so that the direction of greatest length of the slots and rivets extends lengthwise of the clasp and tube, enable the ends of the clasp to be very firmly and securely connected, the relative narrowness of the rivets and slots crosswise of the clasp and socket reducing to the minimum the amount of metal removed from the clasp and socket in forming the slots, and thus fully utilizing the strength of the clasp and socket, the elongation of the rivets lengthwise of the socket and clasp enabling them to withstand advantageously the strain imposed upon them by the clasp.

The cross-section of the socket is continuous excepting where it is interrupted by the slots $f$, so that the socket cannot be expanded or opened. The sides of the socket surrounding the slots $f$ therefore constitute inextensible rigid seats for the heads of the rivets, the seats at one side of the socket serving as anvils on which the heads $g^2$ are formed.

I claim—

A rubber-tire clasp comprising a metal band or tape oblong in cross-section and having oblong longitudinally-extending slots near its ends, a socket composed of a flattened tube conforming in cross-section to the cross-section of the band and having two pairs of oblong longitudinally-extending slots formed in its outer and inner sides, the slots of each pair coinciding with one of the slots of the tape, and oblong rivets formed to fit the slots in the socket and band, the cross-section of the socket being continuous excepting where it is interrupted by the slots, so that the sides of the socket surround the slots and constitute rigid or non-extensible rivet-head seats, the seats at one side of the socket supporting the previously-formed heads of the rivets, while the seats on the opposite side constitute anvils on which the ends of the rivet-shanks are upset.

In testimony whereof I have affixed my signature in presence of two witnesses.

HUGH R. AULD.

Witnesses:
C. F. BROWN,
A. D. HARRISON